No. 715,425. Patented Dec. 9, 1902.
G. H. SCHAMP.
SWIVELED VALVE PIPE UNION.
(Application filed Feb. 4, 1902.)

(No Model.)

Witnesses:
George Oltsch
Hugo Oltsch

George H. Schamp.
Inventor
By Schmann & Dalton
Attys.

United States Patent Office.

GEORGE H. SCHAMP, OF RIDGEVILLE, INDIANA, ASSIGNOR OF ONE-HALF TO ENOCH W. BUCK, OF PORTLAND, INDIANA.

SWIVELED-VALVE PIPE-UNION.

SPECIFICATION forming part of Letters Patent No. 715,425, dated December 9, 1902.

Application filed February 4, 1902. Serial No. 92,533. (No model.)

*To all whom it may concern:*

Be it known that I, GEORGE H. SCHAMP, a citizen of the United States, residing at Ridgeville, in the county of Randolph and State of Indiana, have invented certain new and useful Improvements in Swiveled-Valve Pipe-Unions; and I do hereby declare the following to be a full, clear, and exact description of the invention, such as will enable others skilled in the art to which it appertains to make and use the same.

My invention relates to an improved nozzle or union for pipes; and its object is to provide a swiveled-valved nozzle for connection with the main supply to adapt it to be turned in any direction for convenience in its attachment to a pipe or hose and to facilitate the supply in the desired direction.

With these objects in view the invention consists of a pipe-section adapted for engagement with the main supply and having a valve-seat at its top, a revoluble nozzle swiveled on the section and carrying a valve for said valve-seat and means to lock the revoluble nozzle at the desired angle.

Further details of construction will be described in the following specification, and the novel features will be pointed out in the appended claims.

Figure 1:
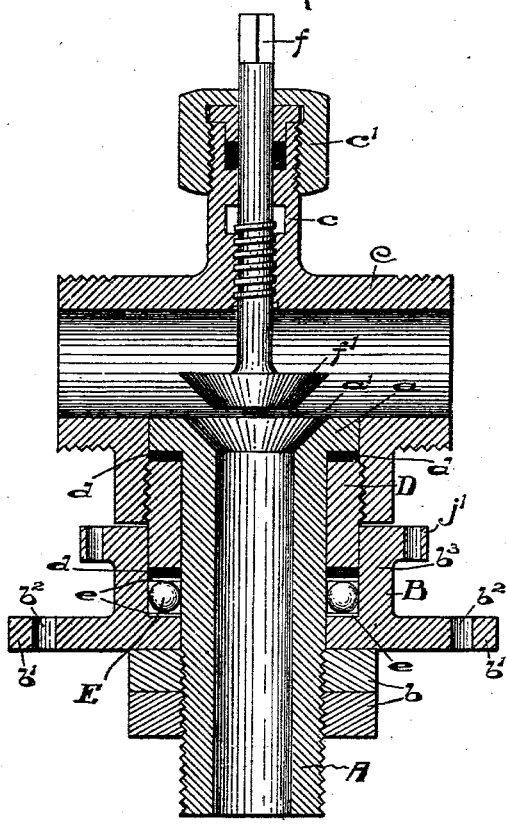
Figure 2:
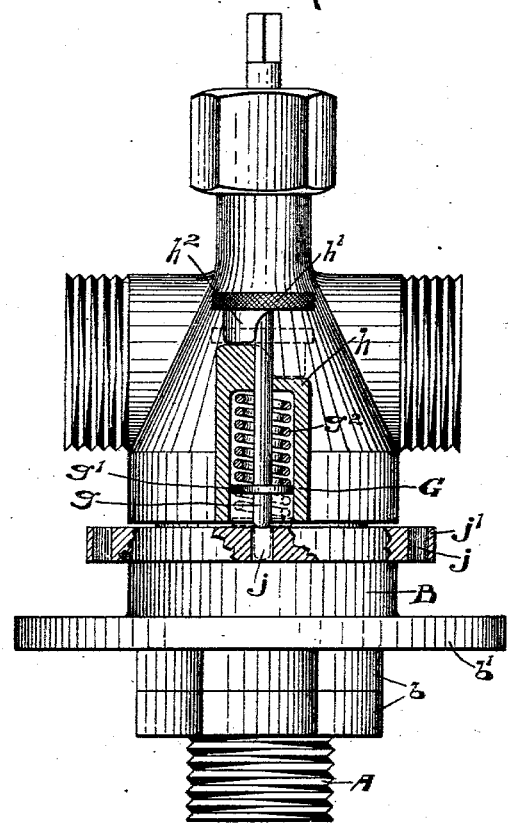

In the drawings, Figure 1 is a vertical longitudinal section of the device. Fig. 2 is a side elevation with the locking means shown in vertical section.

Referring to the drawings, A designates a pipe-section screw-threaded on its lower end, to be secured to a main supply and having an annular flange $a$ and a valve-seat $a'$ at its top. This section A is bound to a casting B by a pair of binding-nuts $b\ b$, screwed upon the lower end of the section A and engaging the under face of the casting. The extended flange portion $b'$ is adapted to be secured to a suitable support by means of bolts passing through the openings $b^2$, and the vertical annular portion $b^3$ provides an annular space around the section A for the reception of a ball-bearing. The upper end of the section A is inserted through an opening in the nozzle C, the said opening having downwardly-extended walls interiorly screw-threaded to receive a sleeve D and gaskets $d\ d$ at each end of the sleeve. In the lower portion of the annular space between the section A and the vertical flange $b^3$ is fitted two bearing rings or plates $e\ e$ for the balls E. The lower ring rests upon the bottom of the casting B, and the upper one engages with the lower gasket $d$. The upper portion of the annular space is closed by the lower end of the sleeve D, which projects downwardly from the lower wall of the nozzle C. It will be seen that the casting B and the section A are held stationary, while the nozzle C and the sleeve D are swiveled thereon to revolve freely, and the gaskets $d$ prevent leakage at the joints, while the ball-bearing provides an efficient swivel.

In the drawings the nozzle is provided with two oppositely screw-threaded ends, but it may be provided with any number of outlets. The top of the nozzle is provided with a boss $c$ and a cap $c'$. Within this boss and cap is fitted a valve-stem $f$, carrying a valve $f'$ at its lower end and in alinement with the valve-seat $a'$, formed in the upper end of the section A. This valve is operated in the usual way. Formed on the side of the nozzle is a cylindrical casing G, in which is mounted a locking-rod $g$, having a collar $g'$ and a coil-spring $g^2$. The upper end of this cylindrical casing is provided with a notched portion $h$, which receives a depending lug $h^2$, formed on one side of the locking-rod $g$ below the thumb-nut $h'$.

When the nozzle is in use, the lug $h^2$ will rest within the recess $h$, and the coil-spring in the casing will hold the locking-rod depressed and in engagement with one of the holes $j$ in the annular flange $j'$, formed on the top of the casting B. When, however, it is desired to turn the nozzle to any preferred angle, the locking-rod is drawn from engagement with the openings J and turned so that the lug $h^2$ rests on the top of the cylindrical casing, as shown in full lines in Fig. 2. In this position the nozzle can be turned until the locking-rod is in alinement with another one of the openings J, when it may be again locked to retain its position.

This nozzle may be used on water, steam, gas, or oil mains or any place where a supply is desired from different directions. It is applicable to fire-extinguishing engines and street-plugs, where a quick coupling is necessary, and for a large variety of purposes.

Having described my invention, what I claim is—

1. In a nozzle, the combination with a pipe-section having a valve-seat, of a nozzle swiveled upon the pipe and carrying a valve, and means to lock the nozzle at different angles.

2. In a nozzle, the combination of a main supply-pipe having a valve-seat, a casting mounted upon the supply-pipe, said supply-pipe having a nozzle swiveled thereon provided with a valve and a locking-rod to engage the casting.

3. In a device of the class described, the combination with a main supply-pipe, of a nozzle swiveled thereon, and a casting mounted on the supply-pipe having a vertical annular flange to provide an annular space around the pipe-section in which the nozzle revolves.

4. In a nozzle, the combination with a pipe-section adapted for engagement with the pipe-main and having a valve-seat in its upper end, a casting mounted on said section, a revoluble nozzle carrying a valve swiveled upon the pipe-section, and ball-bearings in casting, substantially as described.

5. In a device of the class described the combination of a pipe-section adapted for connection with the pipe-main, and having a valve-seat and annular flange at its upper end, a casting mounted on the pipe-section and having a vertical annular flange to provide an annular space around the pipe-section, a nozzle carrying a valve mounted upon the pipe-section, a sleeve secured to said nozzle to close a portion of the annular space, and ball-bearings in the annular space for said sleeve, whereby a swiveled connection is provided for the nozzle, substantially as described.

6. In a device of the class described, the combination with a fixed pipe-section having a casting secured thereto, of a rotatable nozzle swiveled upon the fixed pipe-section, and carrying a valve adapted to seat against the pipe-section, a spring-actuated locking-rod carried by the rotatable nozzle and adapted to engage the casting, and means to hold the rod in an elevated or lowered position.

In testimony whereof I affix my signature in presence of two witnesses.

GEORGE H. SCHAMP.

Witnesses:
H. M. McDONALD,
H. C. GULLETT.